(12) United States Patent
Takamatsu et al.

(10) Patent No.: US 10,864,867 B2
(45) Date of Patent: Dec. 15, 2020

(54) METHOD FOR ADJUSTING SWITCH POSITION, AND OPERATION DEVICE FOR VEHICLE

(71) Applicant: Nissan Motor Co., Ltd., Yokohama (JP)

(72) Inventors: Atsushi Takamatsu, Kanagawa (JP); Hiroaki Miura, Kanagawa (JP); Shinichirou Nakajima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/336,975

(22) PCT Filed: Sep. 29, 2016

(86) PCT No.: PCT/JP2016/078893
§ 371 (c)(1),
(2) Date: Mar. 27, 2019

(87) PCT Pub. No.: WO2018/061154
PCT Pub. Date: Apr. 5, 2018

(65) Prior Publication Data
US 2019/0217796 A1    Jul. 18, 2019

(51) Int. Cl.
*B60R 16/037* (2006.01)
*B60R 16/02* (2006.01)
(Continued)

(52) U.S. Cl.
CPC .......... *B60R 16/037* (2013.01); *B60K 37/06* (2013.01); *B60N 2/002* (2013.01); *B60N 2/02* (2013.01);
(Continued)

(58) Field of Classification Search
CPC ........ B60K 1/04; B60K 17/30; B60K 17/356; B60K 37/06; B60K 7/0007; B60N 2/06; B60N 2/0232; B60N 2/14; B60N 2/22; B60N 2/0224; B60N 2/002; B60N 2/02; B60N 2/0715; B60N 2/0248; B60N 2/1635; B60N 2/0722; B60N 2/245; B60N 2/0244; B60H 1/00064; B60H 1/00864; B60H 1/00964; B60L 8/00; B60L 8/003;
(Continued)

(56) References Cited

U.S. PATENT DOCUMENTS 5,906,645 A   5/1999   Kagawa et al.
9,738,179 B2  8/2017   Ebina et al.
(Continued)

FOREIGN PATENT DOCUMENTS

EP   3025921 A1   6/2016
JP   H07184733 A   7/1995
(Continued)

*Primary Examiner* — Behrang Badii
(74) *Attorney, Agent, or Firm* — Young Basile Hanlon & MacFarlane, P.C.

(57) ABSTRACT

A method for adjusting a switch position includes adjusting a position of a changeover switch for changing over a travel mode of a vehicle between an automated driving mode in which travel of the vehicle is controlled in an automated manner and a manual driving mode in which travel of the vehicle is operated by a driver is adjusted according to a state of the driver seat.

17 Claims, 13 Drawing Sheets

(51) Int. Cl.
*B60N 2/02* (2006.01)
*B60K 37/06* (2006.01)
*B60N 2/00* (2006.01)
*B60N 2/10* (2006.01)
*B60N 2/14* (2006.01)
*B60N 2/20* (2006.01)
*B60R 16/023* (2006.01)
*B60R 21/015* (2006.01)
*G05D 1/00* (2006.01)

(52) U.S. Cl.
CPC ......... *B60N 2/0224* (2013.01); *B60N 2/0248* (2013.01); *B60N 2/0284* (2013.01); *B60N 2/10* (2013.01); *B60N 2/14* (2013.01); *B60N 2/20* (2013.01); *B60R 16/02* (2013.01); *B60K 2370/175* (2019.05); *B60R 16/023* (2013.01); *B60R 21/015* (2013.01); *G05D 1/0061* (2013.01)

(58) Field of Classification Search
CPC ....... B60L 8/006; B60L 50/66; B60W 50/082; B60W 50/14; B60W 10/06; B60W 50/08; B60W 10/20; B60W 30/18; B60W 10/18; B60W 10/11; B60W 10/22; B60W 50/12; B60W 50/087; B60W 30/182; B60W 30/14; B60W 30/02; G05D 1/0088; H04M 1/7253; H04M 1/72533; B62D 1/181; B62D 1/28; B62D 1/183; B62D 15/02; B62D 6/00; B60R 21/01512; B60R 22/48; B60R 16/0232; B60R 16/037; F16H 59/66; B60T 7/12; F02D 29/02; B60G 17/0195; B60G 17/0165; B60G 17/015

See application file for complete search history.

(56) References Cited

U.S. PATENT DOCUMENTS

| | | | |
|---|---|---|---|
| 2015/0161836 A1* | 6/2015 | Park | B60R 25/2045 340/5.51 |
| 2015/0217778 A1* | 8/2015 | Fairgrieve | B60W 10/06 701/37 |
| 2016/0159251 A1* | 6/2016 | Ebina | B60N 2/0248 701/49 |
| 2016/0264021 A1* | 9/2016 | Gillett | H04M 1/7253 |
| 2017/0028987 A1* | 2/2017 | Yamada | B60N 2/062 |
| 2017/0050539 A1* | 2/2017 | Akimoto | B60N 3/063 |
| 2017/0088208 A1* | 3/2017 | Ogawa | B62J 1/28 |
| 2017/0341725 A1* | 11/2017 | Skahan | B64C 1/061 |
| 2018/0022183 A1* | 1/2018 | Choi | B60H 1/00064 454/75 |
| 2018/0029501 A1* | 2/2018 | Wolf | B60R 22/48 |

FOREIGN PATENT DOCUMENTS

| | | |
|---|---|---|
| JP | H09160643 A | 6/1997 |
| JP | H09222922 A | 8/1997 |
| JP | 2001199295 A | 7/2001 |
| JP | 2007335252 A | 12/2007 |
| JP | 2010089648 A | 4/2010 |
| JP | 2010108185 A | 5/2010 |
| JP | 2015000611 A | 1/2015 |
| JP | 2015051441 A | 3/2015 |

* cited by examiner

METHOD FOR ADJUSTING SWITCH POSITION, AND OPERATION DEVICE FOR VEHICLE

TECHNICAL FIELD

The present invention relates to a method for adjusting a switch position, and an operation device for vehicle.

BACKGROUND

Japanese Patent Application Publication No. JP-2015-051441 A describes a control device of an automated driving vehicle that has an automated driving mode and a manual driving mode. In the automated driving vehicle, a travel mode of the vehicle is set at the automated driving mode when a driver selects the automated driving mode through an operation and is set at the manual driving mode when the driver does not select the automated driving mode.

In the automated driving mode, the vehicle can be made to travel without driving operation by the driver. For this reason, the driver is able to adjust the driver seat and sometimes sits on the driver seat in a posture different from a posture when the travel mode is the manual driving mode by, for example, inclining the seat back of the driver seat to a large degree or moving the driver seat rearward to a large extent.

When the driver changes his/her posture between the automated driving mode and the manual driving mode in this manner, the driver sometimes has difficulty in operating a changeover switch for changing over the travel mode of the vehicle between the automated driving mode and the manual driving mode. For example, when the driver cannot reach the changeover switch while leaning on the inclined seat back, the driver is required to sit up from the seat back and operate the changeover switch.

An object of the present invention is to inhibit operability of a changeover switch for changing over a travel mode of a vehicle between an automated driving mode and a manual driving mode from deteriorating depending on posture of a driver.

SUMMARY

According to an aspect of the present invention, there is provided a method for adjusting a switch position in which a position of a changeover switch for changing over a travel mode of a vehicle between an automated driving mode in which travel of the vehicle is controlled in an automated manner and a manual driving mode in which travel of the vehicle is operated by a driver is adjusted. In this method for adjusting, a position of the changeover switch is adjusted according to a state of the driver seat including at least either a position of the driver seat or inclination of the driver seat.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Hereinafter, embodiments of the present invention will be described with reference to the drawings.

First Embodiment (Configuration)

Figure 1:
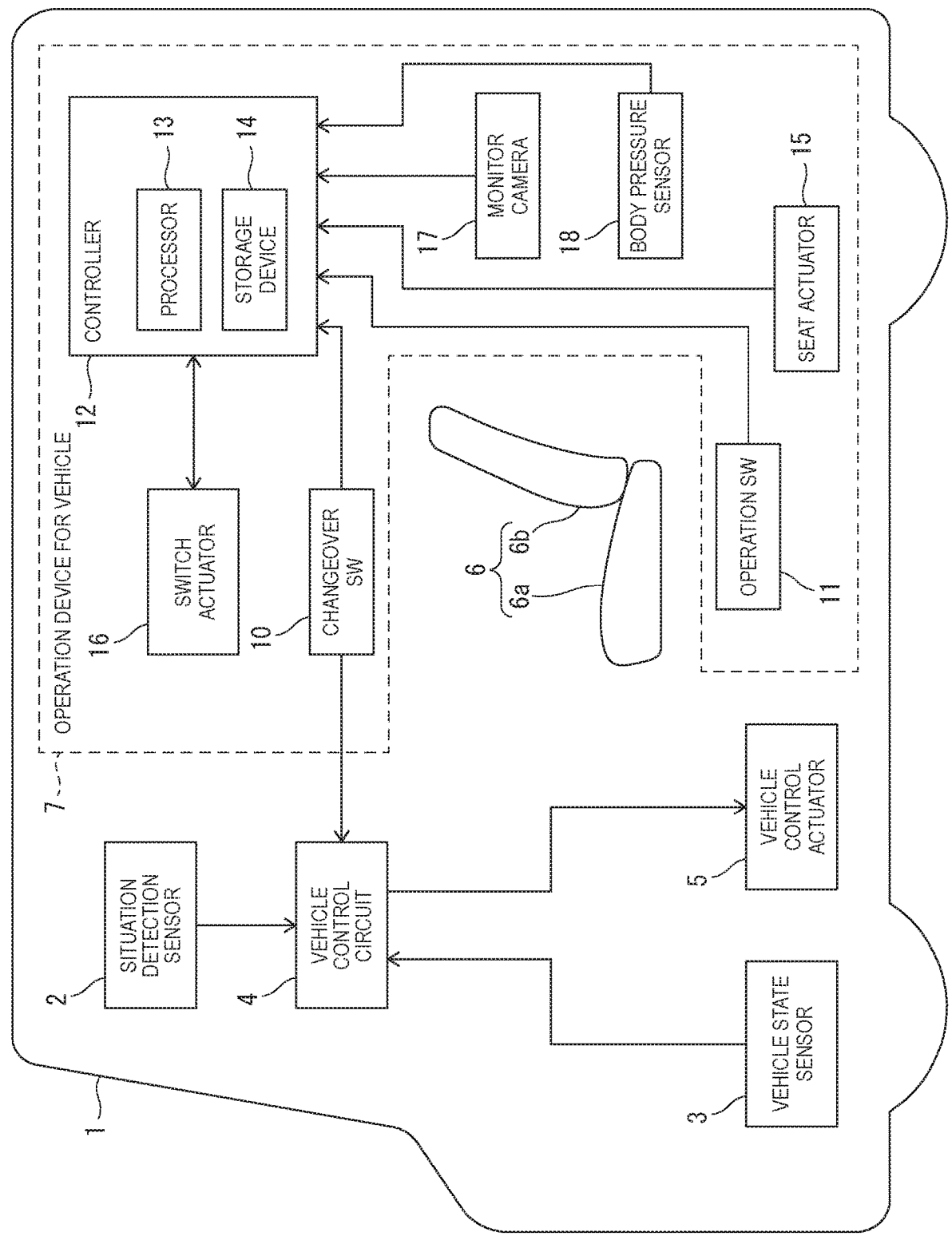
FIG. 1 is a diagram illustrative of a configuration example of a vehicle including an operation device for vehicle according to embodiments.

FIG. 1 is now referred to. A vehicle 1 includes situation detection sensors 2, vehicle state sensors 3, a vehicle control circuit 4, vehicle control actuators 5, a driver seat 6, and an operation device 7 for vehicle.

The situation detection sensors 2 include sensors for detecting situation around the circumference of the vehicle 1 that are required to be obtained for automated driving of the vehicle 1 performed by the vehicle control circuit 4. For example, the situation detection sensors 2 may include cameras for detecting relative positions of the vehicle and another vehicle, distance between the vehicle 1 and another vehicle, an obstacle present around the circumference of the vehicle 1, white lines on the road around the circumference of the vehicle 1, and the like. For example, the situation detection sensors 2 may include range sensors for detecting relative positions of the vehicle 1 and another vehicle, distance between the vehicle 1 and another vehicle, an obstacle present around the circumference of the vehicle 1, and the like. The range sensors may, for example, be laser range finders or sonars.

The situation detection sensors 2 output information on detected circumference situation to the vehicle control circuit 4.

The vehicle state sensors 3 include sensors for detecting a traveling state of the vehicle 1 and sensors for detecting driving operation performed by a driver.

For example, the sensors for detecting a traveling state of the vehicle 1 may include a vehicle speed sensor, an acceleration sensor, and a yaw rate sensor. For example, the sensors for detecting driving operation performed by the driver may include an accelerator opening degree sensor, a brake switch, and a steering operation amount sensor.

The vehicle speed sensor detects wheel speed of the vehicle 1 and, based on the wheel speed, calculates speed of the vehicle 1. The acceleration sensor detects acceleration in the longitudinal direction and acceleration in the vehicle width direction of the vehicle 1. The yaw rate sensor detects a yaw rate (a change rate of rotation angle in a direction in which the vehicle body turns) of the vehicle.

The accelerator opening degree sensor detects an accelerator opening degree of the vehicle. The brake switch detects a working state of braking operation by the driver on the vehicle. The steering operation amount sensor detects the amount of operation of the steering wheel of the vehicle. The steering operation amount sensor may detect a turning angle of steered wheels as information on the amount of operation of the steering wheel.

The vehicle state sensors 3 output such information on a traveling state of the vehicle 1 and such information on driving operation performed by the driver, which are detected by the sensors, to the vehicle control circuit 4.

The vehicle control circuit 4 is an electronic control unit that performs driving control of the vehicle. The vehicle control circuit 4 includes a processor and peripheral components, such as a storage device.

The processor may, for example, be a central processing unit (CPU) or a micro-processing unit (MPU). The storage device may include any of a semiconductor storage device, a magnetic storage device, and an optical storage device.

The storage device may include a register, a cache memory, and a memory, such as a read only memory (ROM) and a random access memory (RAM), which are used as a main storage device.

The vehicle control circuit 4 may be achieved by a functional logic circuit that is set in a general purpose semiconductor integrated circuit. For example, the vehicle control circuit 4 may include a programmable logic device (PLD), such as a field-programmable gate array (FPGA), and the like.

Travel modes of the vehicle 1 controlled by the vehicle control circuit 4 include a manual driving mode and an automated driving mode.

In the manual driving mode, the vehicle control circuit 4 detects driving operation performed by the driver. For example, the vehicle control circuit 4 detects driving operation performed by the driver by means of the vehicle state sensors 3. The vehicle control circuit 4 controls vehicle behavior of the vehicle in response to the driving operation performed by the driver. Hereinafter, a travel mode of the vehicle 1 is simply referred to as a "travel mode".

In the automated driving mode, the vehicle control circuit 4 generates a route along which the vehicle is made to travel, according to situation around the circumference of the vehicle 1 detected by the situation detection sensors 2 and a traveling state of the vehicle 1 detected by the vehicle state sensors 3 and, based on the generated route, makes the vehicle 1 travel in an automated manner. On this occasion, the vehicle control circuit 4 drives the vehicle control actuators 5 in such a way that the vehicle 1 travels in an autonomous manner according to the situation around the circumference of the vehicle 1, detected by the situation detection sensors 2, and the traveling state of the vehicle 1, detected by the vehicle state sensors 3.

The vehicle control actuators 5 operate the steering wheel, the accelerator opening degree, and a braking device of the vehicle 1 in response to a control signal from the vehicle control circuit 4 and thereby generates vehicle behavior of the vehicle 1. The vehicle control actuators 5 include a steering actuator, an accelerator opening degree actuator, and a brake control actuator.

The steering actuator controls the steering direction and steering amount of the steering wheel of the vehicle 1. The accelerator opening degree actuator controls the accelerator opening degree of the vehicle 1. The brake control actuator controls braking operation of the braking device of the vehicle 1.

An operation of changing over the travel mode between the automated driving mode and the manual driving mode is accepted by the operation device 7 for vehicle.

The operation device 7 for vehicle also accepts an operation of adjusting a state of the driver seat 6.

The operation device 7 for vehicle includes a changeover switch 10, operation switches 11, a controller 12, seat actuators 15, a switch actuator 16, a monitor camera 17, and body pressure sensors 18. Note that, in FIG. 1, the changeover switch and the operation switch are indicated as a changeover SW and an operation SW, respectively.

The driver seat 6 includes a seat cushion 6a serving as a seat portion on which the driver sits and a seat back 6b serving as a backrest.

The state of the driver seat 6 may include at least one of a position of the driver seat 6, inclination of the driver seat 6, and a rotational position of the driver seat 6 in a rotational direction about the up-down direction of the driver seat 6 as a rotational axis.

The position of the driver seat 6 may include at least either a position of the driver seat 6 in the longitudinal direction of the vehicle 1 (that is, a position of the seat cushion 6a or the seat back 6b in the longitudinal direction) or height of the seat cushion 6a.

The inclination of the driver seat 6 may include at least either inclination of the seat surface of the seat cushion 6a with respect to a horizontal plane of the vehicle 1 or inclination of the seat back 6b with respect to the vertical direction of the vehicle 1.

The operation switches 11 are disposed to the driver seat 6 or in a neighborhood of the driver seat 6 and accept operation by the driver to adjust the state of the driver seat 6.

Figure 2:
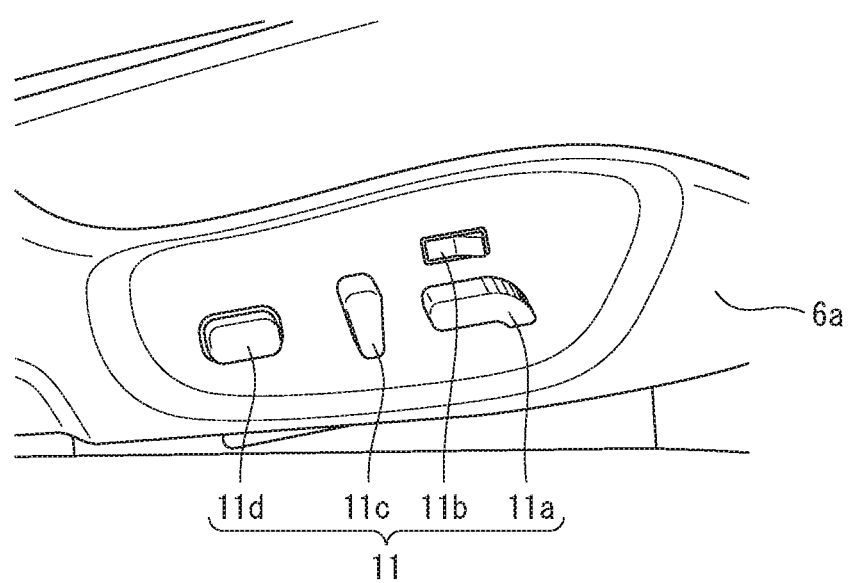
FIG. 2 is a diagram illustrative of an example of operation switches.

FIG. 2 is now referred to. For example, the operation switches 11 may be disposed on a side surface of the driver seat 6. The operation switches 11 include a slide lifter switch 11a, a rotation switch 11b, a reclining switch 11c, and a setting switch 11d.

The slide lifter switch 11a is used for changing the position of the driver seat 6 in the longitudinal direction, changing the height of the seat cushion 6a, and changing the inclination of the seat surface of the seat cushion 6a with respect to a horizontal plane of the vehicle 1.

The rotation switch 11b is used for rotating the driver seat 6 about the up-down direction of the driver seat 6 as a rotational axis.

The reclining switch 11c is used for changing the inclination of the seat back 6b with respect to the vertical direction of the vehicle 1.

The setting switch 11d is used for accepting an operation by the driver to store a present state of the driver seat 6 in the operation device 7 for vehicle.

FIG. 1 is referred to again. The seat actuators 15 change the state of the driver seat 6 in accordance with an operation on the operation switches 11. That is, the seat actuators 15 changes the position of the driver seat 6, the inclination of the driver seat 6, or the rotational position of the driver seat 6 in the rotational direction about the up-down direction of the driver seat 6 as a rotational axis.

The changeover switch 10 accepts an operation by the driver to change over the travel mode between the automated driving mode and the manual driving mode.

A position of the changeover switch 10 is adjusted according to the state of the driver seat 6, which is changed by the seat actuators 15, and the adjustment of the position of the changeover switch 10 is driven by the switch actuator 16.

Figure 3:
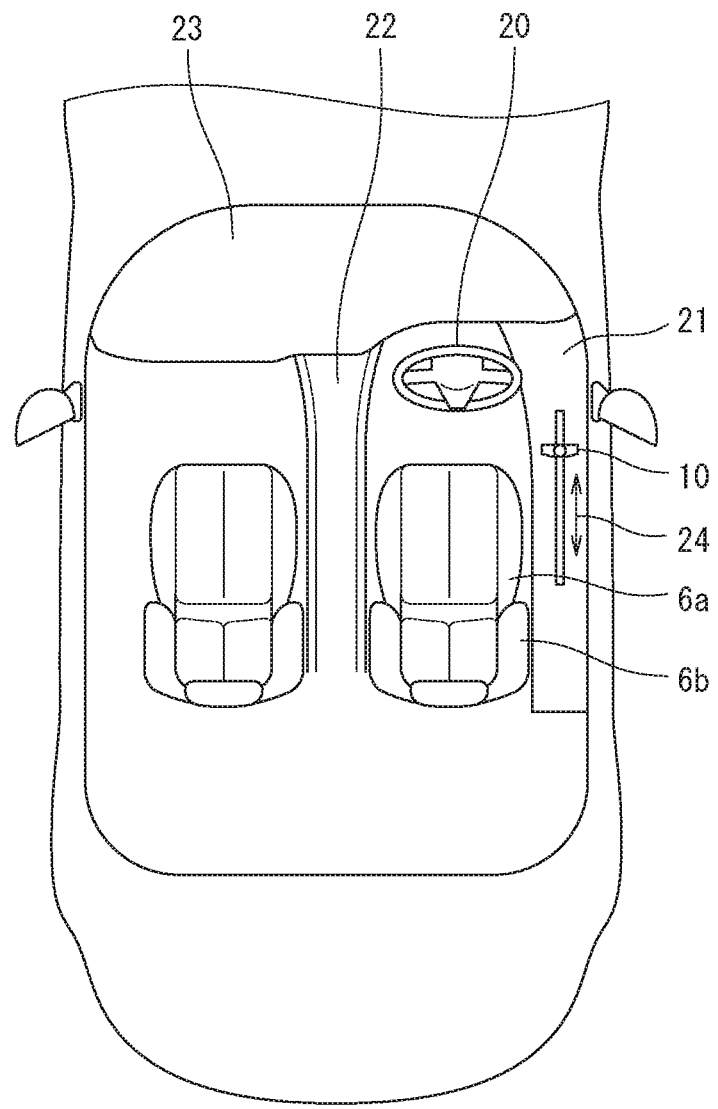
FIG. 3 is a diagram illustrative of a first example of a changeover switch.

FIG. 3 is now referred to. Reference numerals 20, 21, 22, and 23 denote a steering wheel of the vehicle 1, a side console that is disposed on a side of the driver seat of the vehicle 1, a center console that is disposed at the middle in the vehicle width direction of the vehicle 1, and a dashboard that faces the driver seat and a front passenger seat, respectively.

For example, the changeover switch 10 may be disposed on the side console 21 or the center console 22.

For example, the switch actuator 16 may move the changeover switch 10 in the longitudinal direction as indicated by an arrow 24 following or according to the movement of the driver seat 6 in the longitudinal direction and the inclination of the driver seat 6.

Figure 4:
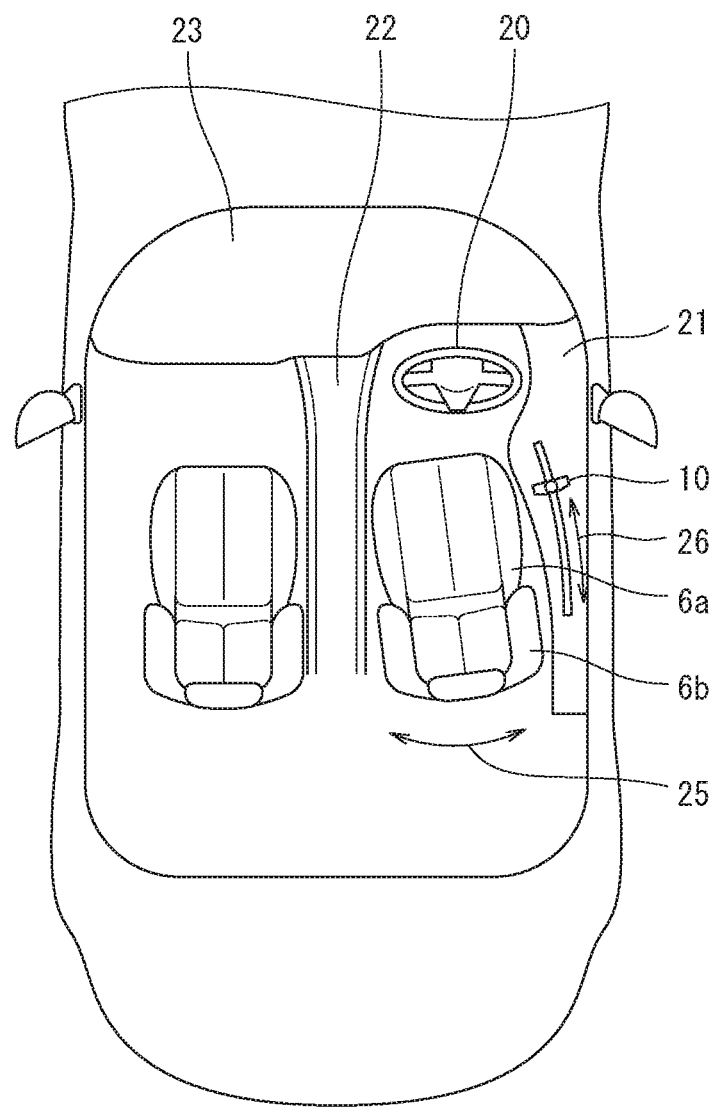
FIG. 4 is a diagram illustrative of a second example of the changeover switch.

For example, the switch actuator 16 may also move the changeover switch 10 within a two-dimensional plane (that is, in the longitudinal direction and the lateral direction) in such a way that the changeover switch 10 rotationally moves in a rotational direction indicated by an arrow 26 in FIG. 4 following or according to the rotation of the driver seat 6 indicated by an arrow 25 in FIG. 4.

The switch actuator 16 may also move the changeover switch 10 in the up-down direction following change in or according to the height of the seat cushion 6a.

In this case, the switch actuator 16 is an example of a movement mechanism that moves the changeover switch 10 according to the state of the driver seat 6.

Figure 5:
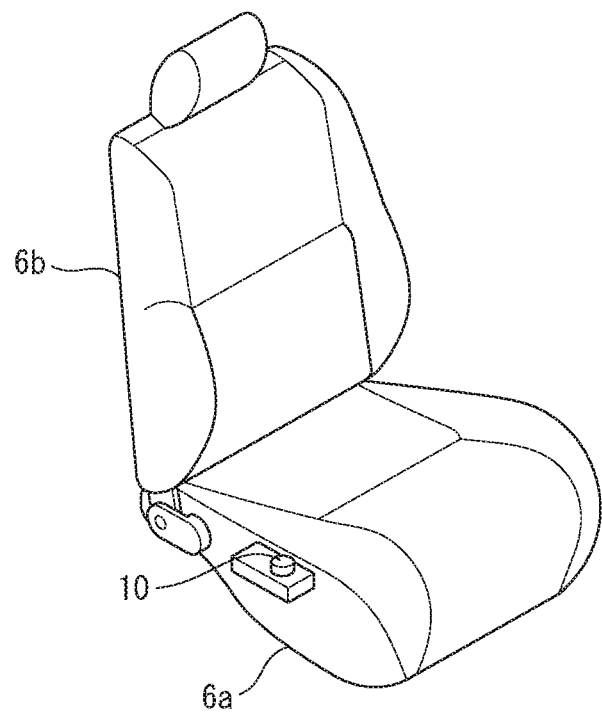
FIG. 5 is a diagram illustrative of a third example of the changeover switch.

The changeover switch 10 may be disposed to the driver seat 6. FIG. 5 is now referred to. For example, the changeover switch 10 may be disposed on a side surface of the driver seat 6 that faces the side console 21. In this case, since, when the driver seat 6 rotates or moves in the longitudinal direction, the changeover switch 10 also moves in association with the rotation or the longitudinal movement, an actuator that moves the changeover switch 10 according to the rotation of the driver seat 6 or the movement of the driver seat 6 in the longitudinal direction may be omitted. In addition, since, when the seat surface of the seat cushion 6a inclines, the changeover switch 10 also moves in association with the inclination, an actuator that moves the changeover switch 10 according to the inclination of the seat surface of the seat cushion 6a may be omitted.

In this case, the switch actuator 16 and the seat actuators 15 are an example of a movement mechanism that moves the changeover switch 10 according to the movement of the driver seat 6.

Figure 6:
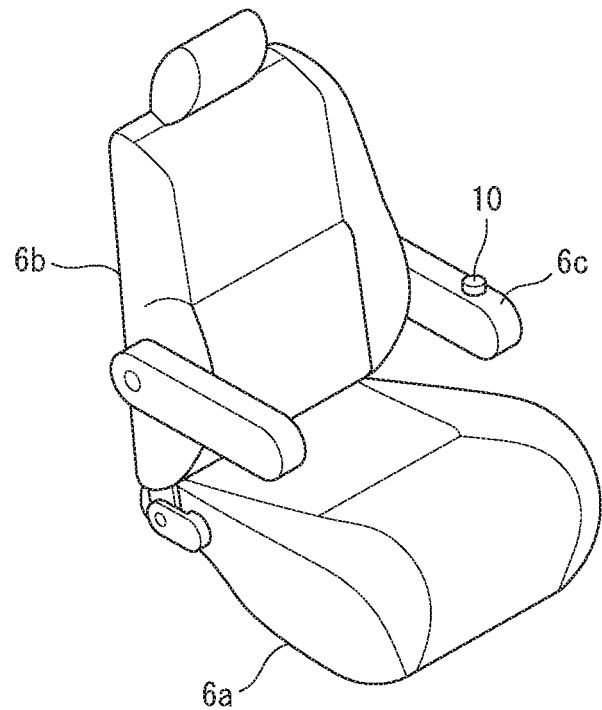
FIG. 6 is a diagram illustrative of a fourth example of the changeover switch.

FIG. 6 is now referred to. For example, the changeover switch 10 may be disposed to an armrest 6c of the driver seat 6. In this case, since, when the driver seat 6 rotates or moves in the longitudinal direction, the changeover switch 10 also moves in association with the rotation or the longitudinal movement, an actuator that moves the changeover switch 10 according to the rotation of the driver seat 6 or the movement of the driver seat 6 in the longitudinal direction may be omitted. In addition, since, when the seat back 6b inclines, the changeover switch 10 also moves in association with the inclination, an actuator that moves the changeover switch 10 according to the inclination of the seat back 6b may be omitted.

FIG. 1 is referred to again. The seat actuators 15 output detected signals on the state of the driver seat 6 to the controller 12.

For example, the seat actuators 15 output detected signals of the positions of the seat cushion 6a and the seat back 6b in the longitudinal direction, a detected signal of the inclination of the seat surface of the seat cushion 6a with respect to a horizontal plane of the vehicle 1, a detected signal of the inclination of the seat back 6b with respect to the vertical direction of the vehicle 1, and a detected signal of the rotational position of the driver seat 6 to the controller 12.

The switch actuator 16 outputs a detected signal of the position of the changeover switch 10 to the controller 12.

The controller 12 is an electronic control unit that controls the state of the driver seat 6 and the position of the changeover switch 10. The controller 12 includes a processor 13 and peripheral components, such as a storage device 14.

The processor 13 may, for example, be a CPU or an MPU. The storage device 14 may include any of a semiconductor storage device, a magnetic storage device, and an optical storage device.

The storage device 14 may include a register, a cache memory, and a memory, such as a ROM and a RAM, which are used as a main storage device.

The controller 12 may be achieved by a functional logic circuit that is set in a general purpose semiconductor integrated circuit. For example, the controller 12 may include a PLD, such as an FPGA, and the like.

The controller 12 drives the seat actuators 15 in accordance with adjustment operation on the state of the driver seat 6 accepted by the operation switches 11 and thereby changes the state of the driver seat 6. The controller 12 also drives the switch actuator 16 in such a way that the changeover switch 10 moves according to change in the state of the driver seat 6 caused by the seat actuators 15.

The controller 12 detects a sitting position of the driver who sits on the driver seat 6 and drives the switch actuator 16 in such a way that the changeover switch 10 moves according to the sitting position.

The monitor camera 17 captures an image of the driver sitting on the driver seat 6 and outputs an image signal of the driver to the controller 12.

The body pressure sensors 18 are disposed in the seat surface of the seat cushion 6a and the seat back 6b and detect body pressure distribution of the driver by converting pressure according to driving posture of the driver into a voltage signal. The body pressure sensors 18 output the signal of body pressure distribution of the driver to the controller 12.

The controller 12 detects a sitting position of the driver, based on the image signal of the driver generated by the monitor camera 17, the body pressure distribution of the driver detected by the body pressure sensors 18, and the state of the driver seat 6.

Figure 7:
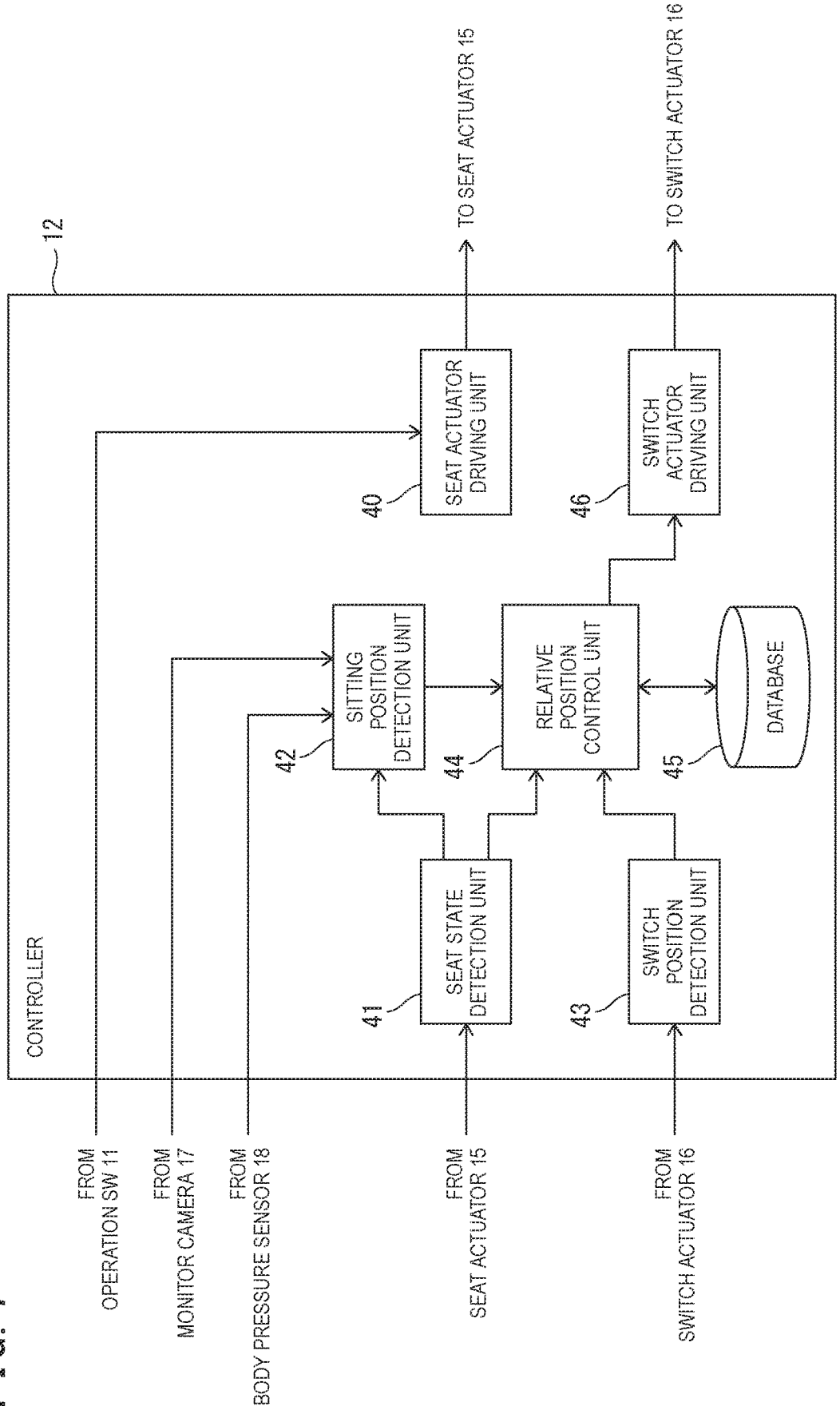
FIG. 7 is a block diagram illustrative of an example of a functional configuration of a controller according to a first embodiment.

FIG. 7 is now referred to. The controller 12 includes a seat actuator driving unit 40, a seat state detection unit 41, a sitting position detection unit 42, a switch position detection unit 43, a relative position control unit 44, a database 45, and a switch actuator driving unit 46.

The processor 13 of the controller 12 achieves functions of the seat actuator driving unit 40, the seat state detection unit 41, the sitting position detection unit 42, the switch position detection unit 43, the relative position control unit 44, and the switch actuator driving unit 46 by executing a computer program stored in the storage device 14.

The database 45 is stored in the storage device 14.

The seat actuator driving unit 40 receives an operation signal output from the operation switches 11 in response to an operation performed by the driver to adjust the state of the driver seat 6. The seat actuator driving unit 40 drives the seat actuators 15 in accordance with the operation signal received from the operation switches 11 and thereby changes the state of the driver seat 6.

The seat state detection unit 41 receives detected signals of the state of the driver seat 6 from the seat actuators 15. The seat state detection unit 41 detects the state of the driver seat 6 based on the received detected signals. The seat state detection unit 41 outputs information on the state of the driver seat 6 to the sitting position detection unit 42 and the relative position control unit 44. Accordingly, the seat state detection unit 41 outputs the state of the driver seat 6, thus outputs whether or not the state of the driver seat 6 has changed.

The sitting position detection unit 42 receives an image signal of the driver generated by the monitor camera 17 and a signal of body pressure distribution of the driver detected by the body pressure sensors 18.

The sitting position detection unit 42 detects the sitting position of the driver sitting on the driver seat 6, based on the image signal of the driver generated by the monitor camera 17, the body pressure distribution of the driver detected by the body pressure sensors 18, and the state of the driver seat 6 detected by the seat state detection unit 41. For example, the sitting position detection unit 42 may detect a position of the shoulders of the driver as the sitting position of the driver.

The sitting position detection unit 42 outputs information on the sitting position to the relative position control unit 44.

The switch position detection unit 43 receives a detected signal of the position of the changeover switch 10 from the switch actuator 16. The switch position detection unit 43 detects the position of the changeover switch 10, based on the received detected signal. The switch position detection unit 43 outputs position information of the changeover switch 10 to the relative position control unit 44.

When the relative position control unit 44 detects the state of the driver seat 6, the relative position control unit 44 reads a target position of the changeover switch 10 corresponding to a changed state of the driver seat 6 from the database 45 that is predetermined according to the state of the driver seat 6.

The relative position control unit 44 controls the switch actuator driving unit 46 in such a way that a position indicated by the position information of the changeover switch 10 input from the switch position detection unit 43 coincides with the target position read from the database 45. The switch actuator driving unit 46 drives the switch actuator 16 in response to a control signal from the relative position control unit 44. Through this operation, the relative position control unit 44 adjusts the position of the changeover switch 10 according to the changed state of the driver seat 6. For example, the relative position control unit 44 moves the changeover switch 10 in such a way that the position of the changeover switch 10 follows change in the state of the driver seat 6.

For example, the target position of the changeover switch 10 stored in the database 45 may be set in such a way that, the more rearward the seat cushion 6a is positioned, the more rearward the target position of the changeover switch 10 is located. That is, when the seat cushion 6a is moved in the longitudinal direction, the relative position control unit 44 moves the position of the changeover switch 10 more rearward as the seat cushion 6a is positioned more rearward.

For example, the target position of the changeover switch 10 stored in the database 45 may also be set in such a way that, the more downward the seat surface of the seat cushion 6a is inclined from the front to the rear, the more rearward the target position of the changeover switch 10 is located. That is, when the inclination of the seat surface of the seat cushion 6a is changed, the relative position control unit 44 moves the position of the changeover switch 10 more rearward as the front of the seat surface of the seat cushion 6a is inclined more downward.

For example, the target position of the changeover switch 10 stored in the database 45 may also be set in such a way that, the more rearward the seat back 6b is positioned, the more rearward the target position of the changeover switch 10 is located. That is, when the seat back 6b is moved in the longitudinal direction, the relative position control unit 44 moves the position of the changeover switch 10 more rearward as the seat back 6b is positioned more rearward.

For example, the target position of the changeover switch 10 stored in the database 45 may also be set in such a way that, the more greatly the seat back 6b of the vehicle 1 is inclined rearward with respect to the vertical direction of the seat back 6b, the more rearward the target position of the changeover switch 10 is located. That is, when the inclination of the seat back 6b is changed, the relative position control unit 44 moves the position of the changeover switch 10 more rearward as the seat back 6b is inclined more greatly.

When the relative position control unit 44 detects a change in the sitting position of the driver sitting on the driver seat 6, the relative position control unit 44 reads a target position of the changeover switch 10 corresponding to the changed sitting position from the database 45 storing target positions of the changeover switch 10 predetermined according to sitting positions.

For example, when the changeover switch 10 is not present within a predetermined distance range from the shoulders of the driver detected as a sitting position of the driver or the sitting position of the driver, the relative position control unit 44 may read a target position of the changeover switch 10 from the database 45. When the changeover switch 10 is present within a predetermined distance range from the shoulders of the driver, the changeover switch 10 does not have to be moved. The predetermined distance may, for example, be 500 mm. Note that the sitting position does not always have to be the center and is only required to be a predetermined position. When the sitting position is set at a predetermined position, a predetermined database corresponding to the position can be used.

The relative position control unit 44 controls the switch actuator driving unit 46 in such a way that a position indicated by the position information of the changeover switch 10 input from the switch position detection unit 43 coincides with the target position read from the database.

For example, the target position of the changeover switch 10 stored in the database 45 may be set in such a way that, the more rearward the sitting position is located, the more rearward the target position of the changeover switch 10 is located. That is, the relative position control unit 44 moves the position of the changeover switch 10 more rearward as the sitting position is located more rearward.

(Operation)

Figure 8:
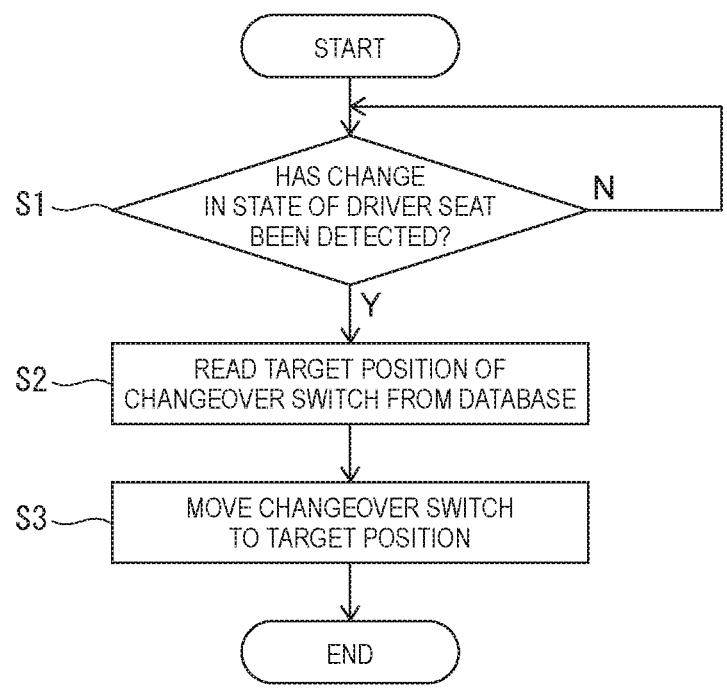
FIG. 8 is a flowchart illustrative of a first example of a method for adjusting a switch position according to the first embodiment.

A first example of a method for adjusting a switch position according to the first embodiment will be described. FIG. 8 is now referred to.

In step S1, the relative position control unit 44 determines whether or not the relative position control unit 44 has detected a change in a state of the driver seat 6. When the relative position control unit 44 has detected a change in the state of the driver seat 6 (Y in step S1), the process proceeds to step S2. When the relative position control unit 44 has not detected a change in the state of the driver seat 6 (N in step S1), the process returns to step S1.

In step S2, the relative position control unit 44 detects a changed state of the driver seat 6 and reads a target position of the changeover switch 10 corresponding to the changed state of the driver seat 6 from the database 45.

In step S3, the relative position control unit 44 controls the switch actuator driving unit 46 in such a way that a position indicated by position information of the changeover switch 10 input from the switch position detection unit 43 coincides with the target position read from the database 45. Through this operation, the relative position control unit 44 moves the changeover switch 10 to the target position.

Figure 9:
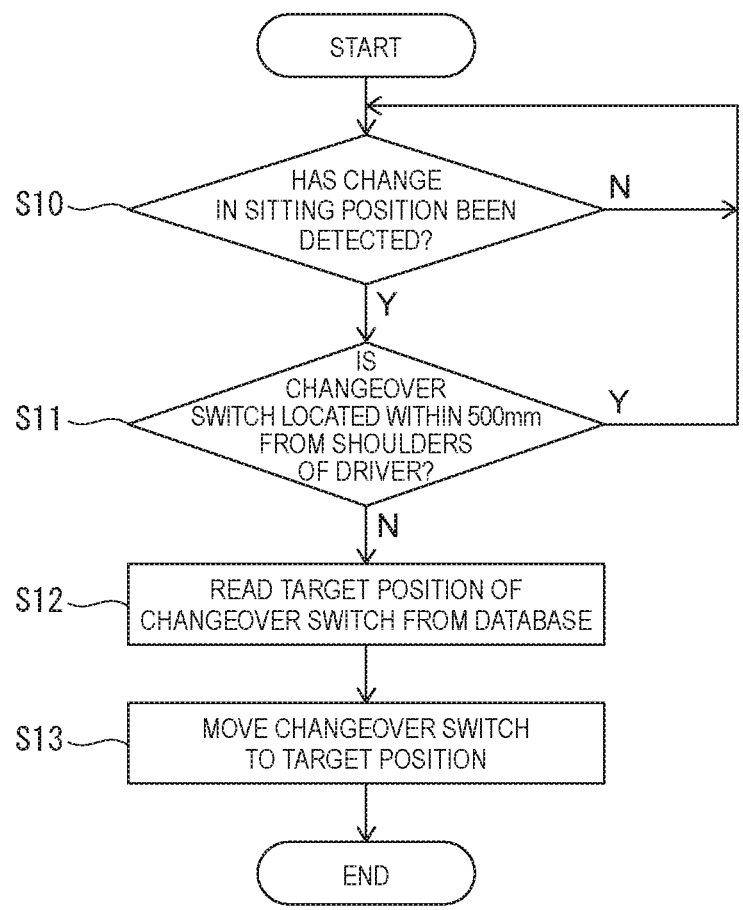
FIG. 9 is a flowchart illustrative of a second example of the method for adjusting the switch position according to the first embodiment.

With reference to FIG. 9, a second example of the method for adjusting the switch position according to the first embodiment will be described.

In step S10, the relative position control unit 44 determines whether or not the relative position control unit 44 has detected a change in a sitting position of a driver sitting on the driver seat 6. When the relative position control unit 44 has detected a change in the sitting position (Y in step S10), the process proceeds to step S11. When the relative position control unit 44 has not detected a change in the sitting position (N in step S10), the process returns to step S10.

In step S11, the relative position control unit 44 determines whether or not the changeover switch 10 is present within a range of 500 mm from the shoulders of the driver. When the changeover switch 10 is present within the range of 500 mm from the shoulders of the driver (Y in step S11), the process returns to step S10. When the changeover switch 10 is not present within the range of 500 mm from the shoulders of the driver (N in step S11), the process proceeds to step S12.

In step S12, the relative position control unit 44 reads a target position of the changeover switch 10 corresponding to a changed sitting position from the database 45.

In step S13, the relative position control unit 44 controls the switch actuator driving unit 46 in such a way that a position indicated by position information of the changeover switch 10 input from the switch position detection unit 43 coincides with the target position read from the database 45. Through this operation, the relative position control unit 44 moves the changeover switch 10 to the target position.

(Advantageous Effects of First Embodiment)

(1) The relative position control unit 44 moves the changeover switch 10 for changing over a travel mode of the vehicle 1 between an automated driving mode in which travel of the vehicle 1 is controlled in an automated manner and a manual driving mode in which travel of the vehicle 1 is operated by a driver according to a state of the driver seat 6 changed by the seat actuators 15.

This operation enables operability of the changeover switch 10, which changes over the travel mode of the vehicle between the automated driving mode and the manual driving mode, to be inhibited from deteriorating depending on posture of the driver.

(2) The seat state detection unit 41 detects a position of the seat cushion 6a of the driver seat as a state of the driver seat 6, and the relative position control unit 44 adjusts the position of the changeover switch 10 more rearward as the position of the seat cushion 6a is located more rearward.

This operation enables the position of the changeover switch 10 to be adjusted according to the position of the seat cushion 6a in the longitudinal direction, which enables the operability of the changeover switch to be inhibited from deteriorating even when the position of the seat cushion 6a in the longitudinal direction changes.

(3) The seat state detection unit 41 detects an inclination of the seat cushion 6a of the driver seat as a state of the driver seat 6, and the relative position control unit 44 adjusts the position of the changeover switch 10 more rearward as the seat surface of the seat cushion 6a is inclined more downward from the front to the rear.

This operation enables the position of the changeover switch 10 to be adjusted according to the inclination of the seat cushion 6a, which enables the operability of the changeover switch 10 to be inhibited from deteriorating even when the inclination of the seat cushion 6a changes.

(4) The seat state detection unit 41 detects a position of the seat back 6b of the driver seat as a state of the driver seat 6, and the relative position control unit 44 adjusts the position of the changeover switch 10 more rearward as the position of the seat back 6b is located more rearward.

This operation enables the position of the changeover switch 10 to be adjusted according to the position of the seat back 6b in the longitudinal direction, which enables the operability of the changeover switch 10 to be inhibited from deteriorating even when the position of the seat back 6b in the longitudinal direction changes.

(5) The seat state detection unit 41 detects an inclination of the seat back 6b of the driver seat as a state of the driver seat 6, and the relative position control unit 44 adjusts the position of the changeover switch 10 more rearward as the inclination of the seat back 6b with respect to the vertical direction of the vehicle 1 increases.

This operation enables the position of the changeover switch 10 to be adjusted according to the inclination of the seat back 6b, which enables operation of the changeover switch 10 to be inhibited from becoming difficult even when the inclination of the seat back 6b changes.

(6) The sitting position detection unit 42 detects a sitting position of the driver sitting on the driver seat 6. The relative position control unit 44 adjusts the position of the changeover switch 10 more rearward as the sitting position is located more rearward.

This operation enables the position of the changeover switch 10 to be adjusted according to the sitting position of the driver, which enables the operation of the changeover switch 10 to be inhibited from becoming difficult even when the sitting position of the driver changes.

(7) The changeover switch 10 is disposed on the center console 22 of the vehicle 1. This configuration can prevent a riding space for the driver from being obstructed due to the installation of the changeover switch 10.

(8) The changeover switch 10 is disposed to the driver seat 6. This configuration can prevent a riding space for the driver from being obstructed due to the installation of the changeover switch 10.

(9) The changeover switch 10 is disposed on the side console 21 of the vehicle 1. This configuration can prevent a riding space for the driver from being obstructed due to the installation of the changeover switch 10.

Second Embodiment

Next, an operation device 7 for vehicle according to a second embodiment will be described. The operation device 7 for vehicle according to the second embodiment switches states of a driver seat 6 depending on whether a travel mode is an automated driving mode or a manual driving mode.

For example, the operation device 7 for vehicle sets a rearward inclination of a seat back 6b with respect to the vertical direction of a vehicle 1 when the travel mode is the automated driving mode to be larger than a rearward inclination of the seat back 6b when the travel mode is the manual driving mode.

For example, the operation device 7 for vehicle sets a position of a seat cushion 6a in the longitudinal direction when the travel mode is the automated driving mode to be located more rearward than a position of the seat cushion 6a when the travel mode is the manual driving mode.

This configuration causes a state of the driver seat 6 to be adjusted in response to switching of the travel mode by means of a changeover switch 10, which enables comfort for a driver to be improved.

Figure 10:
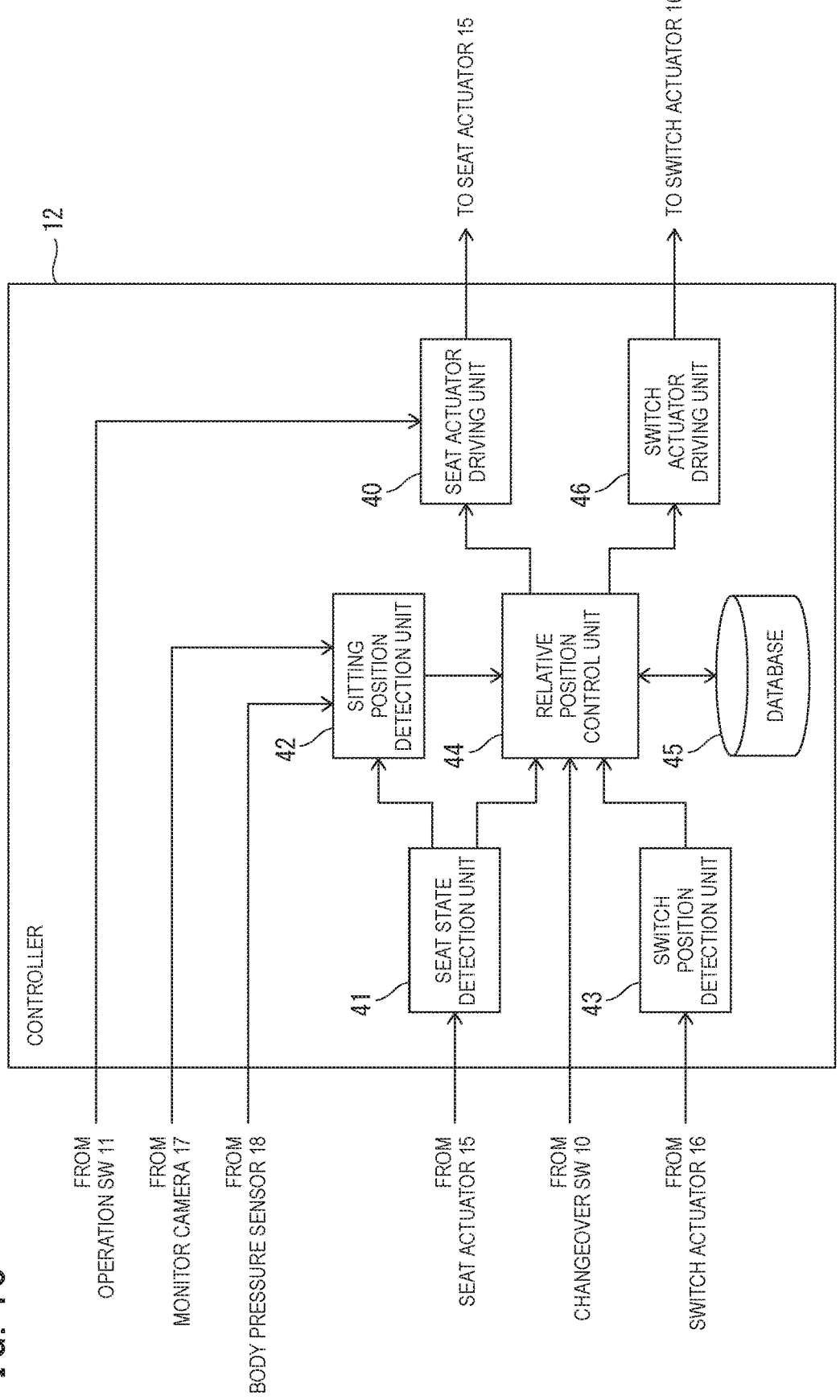
FIG. 10 is a block diagram illustrative of an example of a functional configuration of a controller according to second and third embodiments.

FIG. 10 is now referred to. A relative position control unit 44 receives a selection signal indicating whether the automated driving mode or the manual driving mode is selected as a present travel mode from the changeover switch 10.

When the travel mode is the automated driving mode, the relative position control unit 44 adjusts the inclination of the seat back 6b with respect to the vertical direction of the vehicle 1 to a relatively large angle. The relative position control unit 44 also adjusts the position of the seat cushion 6a in the longitudinal direction to a relatively rearward position.

When the travel mode is the manual driving mode, the relative position control unit 44 adjusts the inclination of the seat back 6b with respect to the vertical direction of the vehicle 1 to a relatively small angle. The relative position control unit 44 also adjusts the position of the seat cushion 6a in the longitudinal direction to a relatively frontward position.

Next, an example of operation of the operation device 7 for vehicle according to the second embodiment will be described.

Figure 11:
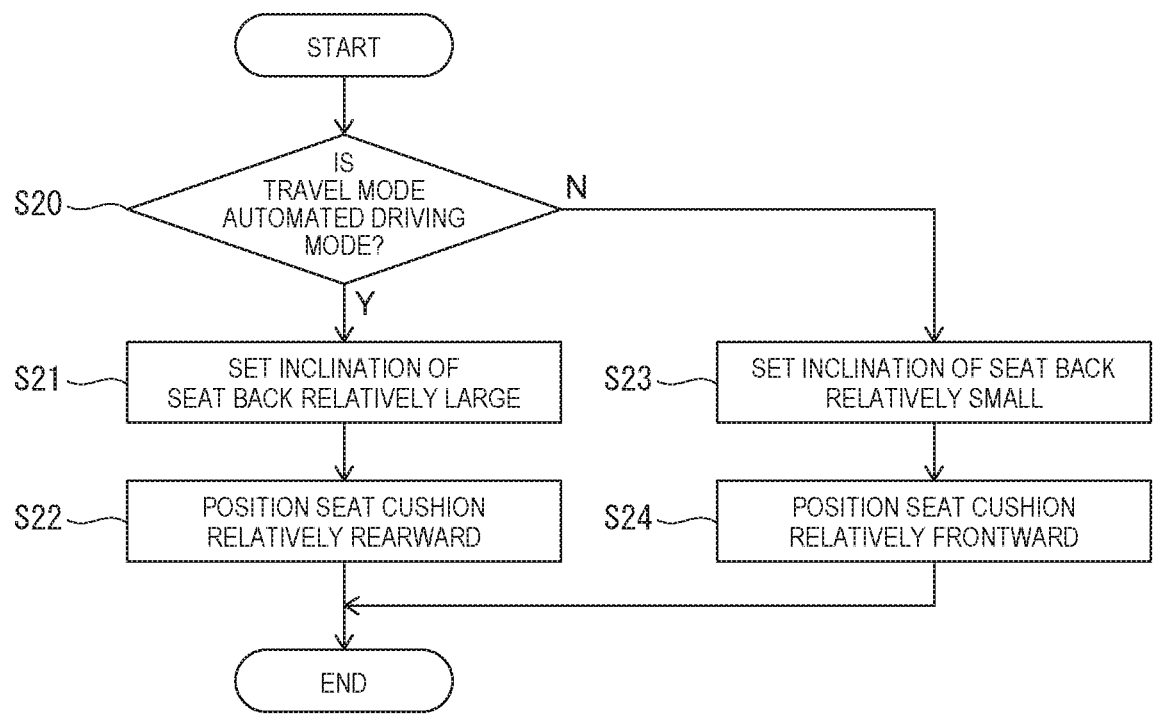
FIG. 11 is a flowchart illustrative of an example of operation of an operation device for vehicle according to the second embodiment.

FIG. 11 is now referred to.

In step S20, the relative position control unit 44 determines whether or not a travel mode is an automated driving mode. When the travel mode is the automated driving mode (Y in step S20), the process proceeds to step S21. When the travel mode is not the automated driving mode, that is, when the travel mode is a manual driving mode (N in step S20), the process proceeds to step S23.

In step S21, the relative position control unit 44 adjusts an inclination of the seat back 6b with respect to the vertical direction of the vehicle 1 to a relatively large angle.

In step S22, the relative position control unit 44 adjusts a position of the seat cushion 6a in the longitudinal direction to a relatively rearward position.

Subsequently, the operation is finished.

In step S23, the relative position control unit 44 adjusts the inclination of the seat back 6b with respect to the vertical direction of the vehicle 1 to a relatively small angle.

In step S24, the relative position control unit 44 adjusts the position of the seat cushion 6a in the longitudinal direction to a relatively frontward position.

Subsequently, the operation is finished.

(Advantageous Effects of Second Embodiment)

(1) The relative position control unit 44 switches inclinations of the seat back 6b with respect to the vertical direction of the vehicle 1 depending on whether a travel mode is an automated driving mode or a manual driving mode. The relative position control unit 44 sets the inclination of the seat back 6b when the travel mode is the automated driving mode to be larger than the inclination of the seat back 6b when the travel mode is the manual driving mode.

This configuration causes the inclination of the seat back 6b to be adjusted in response to switching of the travel mode by means of the changeover switch 10, which enables comfort for a driver to be improved.

(2) The relative position control unit 44 switches positions of the seat cushion 6a depending on whether the travel mode is the automated driving mode or the manual driving mode. The relative position control unit 44 sets the position of the seat cushion 6a when the travel mode is the automated driving mode to be located more rearward than the position of the seat cushion 6a when the travel mode is the manual driving mode.

This configuration causes the position of the seat cushion 6a to be adjusted in response to switching of the travel mode by means of the changeover switch 10, which enables comfort for the driver to be improved.

Third Embodiment

Next, an operation device 7 for vehicle according to a third embodiment will be described. The operation device 7 for vehicle according to the third embodiment stores a state of a driver seat 6 that has been adjusted while a travel mode is a manual driving mode before the travel mode is changed over from the manual driving mode to an automated driving mode. The operation device 7 for vehicle also stores a state of the driver seat 6 that has been adjusted while the travel mode is the automated driving mode. The state of the driver seat 6 may be configured to be stored before the travel mode is changed over from the automated driving mode to the manual driving mode. In the following third embodiment, a case where the state of the driver seat 6 is stored at a timing before the travel mode is changed over from the automated driving mode to the manual driving mode will be described.

When the travel mode is changed over from the manual driving mode to the automated driving mode, the operation device 7 for vehicle adjusts the state of the driver seat 6 to a state stored when the travel mode was the automated driving mode. When the travel mode is changed over from the automated driving mode to the manual driving mode, the operation device 7 for vehicle adjusts the state of the driver seat 6 to a state stored when the travel mode was the manual driving mode.

This configuration enables the state of the driver seat 6 to be adjusted in accordance with a preference of a driver when the travel mode is changed over. This capability enables effort of seat adjustment by the driver to be reduced.

A functional configuration of a controller 12 of the operation device 7 for vehicle according to the third embodiment is the same as the functional configuration of the second embodiment illustrated in FIG. 10.

A relative position control unit 44 receives a selection signal indicating whether the automated driving mode or the manual driving mode is selected as a present travel mode from a changeover switch 10. The relative position control unit 44 determined whether or not the travel mode has been changed over based on the selection signal received from the changeover switch 10.

When the travel mode has been changed over from the automated driving mode to the manual driving mode, in other words, when a travel mode before the changeover was the automated driving mode, the relative position control unit 44 stores information on a present state of the driver seat 6 detected by a seat state detection unit 41 in a storage device 14 as a state for the automated driving mode.

After that, when the travel mode is changed over from the manual driving mode to the automated driving mode, the relative position control unit 44 reads the information on the state for the automated driving mode stored in the storage device 14. The relative position control unit 44 controls a seat actuator driving unit 40 and thereby adjusts the state of the driver seat 6 to the read state for the automated driving mode.

On the other hand, when the travel mode has been changed over from the manual driving mode to the automated driving mode, in other words, when the travel mode before the changeover was the manual driving mode, the relative position control unit 44 stores information on a present state of the driver seat 6 detected by the seat state detection unit 41 in the storage device 14 as a state for the manual driving mode.

After that, when the travel mode is changed over from the automated driving mode to the manual driving mode, the relative position control unit 44 reads the information on the state for the manual driving mode stored in the storage device 14. The relative position control unit 44 controls the seat actuator driving unit 40 and thereby adjusts the state of the driver seat 6 to the read state for the manual driving mode.

Next, an example of operation of the operation device 7 for vehicle according to the third embodiment will be described.

Figure 12:
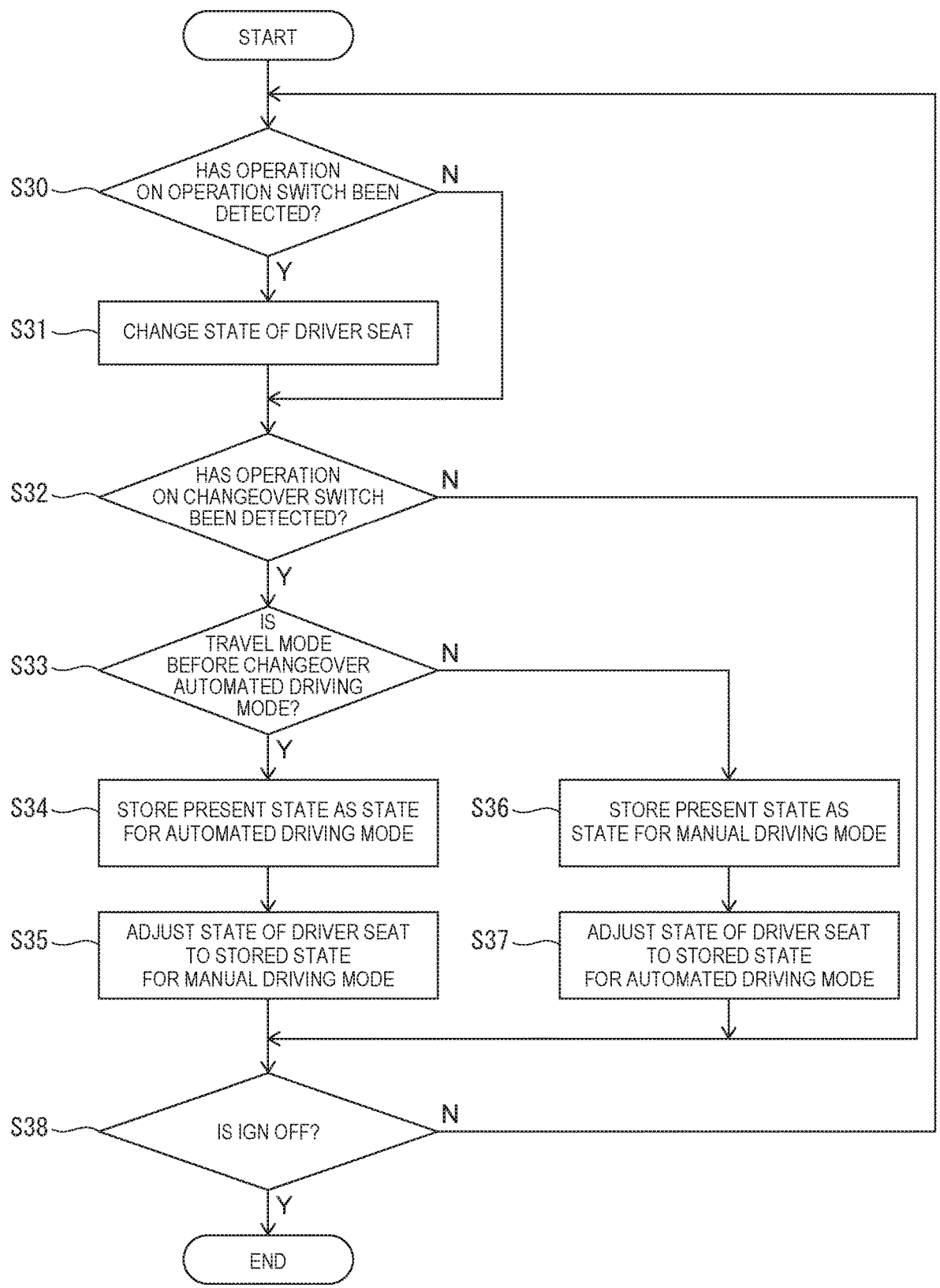
FIG. 12 is a flowchart illustrative of an example of operation of an operation device for vehicle according to the third embodiment.

FIG. 12 is now referred to.

In step S30, the seat actuator driving unit 40 determines whether or not an operation on operation switches 11 by a driver to adjust a state of the driver seat 6 has been detected. When an operation on the operation switches 11 has been detected (Y in step S30), the process proceeds to step S31. When no operation on the operation switches 11 has been detected (N in step S30), step S31 is skipped and the process proceeds to step S32.

In step S31, the seat actuator driving unit 40 drives seat actuators 15 in accordance with the operation signal received from the operation switches 11 and thereby changes the state of the driver seat 6. Subsequently, the process proceeds to step S32.

In step S32, the relative position control unit 44 determines whether or not an operation on the changeover switch 10 by the driver to change over a travel mode has been detected. When an operation on the changeover switch 10 has been detected (Y in step S32), the process proceeds to step S33. When no operation on the changeover switch 10 has been detected (N in step S32), the process proceeds to step S38.

In step S33, the relative position control unit 44 determines whether or not the travel mode before the changeover is an automated driving mode. When the travel mode before the changeover is the automated driving mode (Y in step S33), the process proceeds to step S34. When the travel mode before the changeover is not the automated driving mode, that is, when the travel mode before the changeover is a manual driving mode (N in step S33), the process proceeds to step S36.

In step S34, the relative position control unit 44 stores information on a present state of the driver seat 6 detected by the seat state detection unit 41 in the storage device 14 as a state for the automated driving mode.

In step S35, the relative position control unit 44 controls the seat actuator driving unit 40 and thereby adjusts the state of the driver seat 6 to a state for the manual driving mode stored in the storage device 14. A vehicle control circuit 4 changes over the travel mode to the manual driving mode. Subsequently, the process proceeds to step S38.

In step S36, the relative position control unit 44 stores information on a present state of the driver seat 6 detected by the seat state detection unit 41 in the storage device 14 as a state for the manual driving mode.

In step S37, the vehicle control circuit 4 changes over the travel mode to the automated driving mode. The relative position control unit 44 controls the seat actuator driving unit 40 and thereby adjusts the state of the driver seat 6 to the state for the automated driving mode stored in the storage device 14. Subsequently, the process proceeds to step S38.

In step S38, whether or not an ignition switch (IGN) of a vehicle 1 has been turned off. When the ignition switch of the vehicle 1 has been turned off (Y in step S38), the process is finished. When the ignition switch of the vehicle 1 has not been turned off (N in step S38), the process returns to step S30.

(Advantageous Effects of Third Embodiment)

(1) The relative position control unit 44 stores a state of the driver seat 6 that includes at least any of a position of a seat cushion 6a or a seat back 6b in the longitudinal direction, inclination of the seat surface of the seat cushion 6a with respect to a horizontal plane of the vehicle 1, inclination of the seat back 6b with respect to the vertical direction of the vehicle 1, and a rotational position of the driver seat 6 about the up-down direction of the driver seat 6 as a rotational axis in the storage device 14 before a travel mode is changed over from a manual driving mode to an automated driving mode.

When the travel mode is changed over from the automated driving mode to the manual driving mode after a state of the driver seat 6 has been stored, the relative position control unit 44 adjusts the state of the driver seat 6 to the state stored in the storage device 14.

When the travel mode is changed over to the manual driving mode, this configuration enables the state of the driver seat 6 to be adjusted to a state of the driver seat 6 that was adjusted by the driver when the manual driving mode was selected the last time, which enables the state of the driver seat 6 to be adjusted in accordance with a preference of the driver. This capability enables effort of seat adjustment by the driver to be reduced.

(2) The relative position control unit 44 stores the state of the driver seat 6 that includes at least any of a position of the seat cushion 6a or the seat back 6b in the longitudinal direction, inclination of the seat surface of the seat cushion 6a with respect to a horizontal plane of the vehicle 1, inclination of the seat back 6b with respect to the vertical direction of the vehicle 1, and a rotational position of the driver seat 6 about the up-down direction of the driver seat 6 as a rotational axis in the storage device 14 before the travel mode is changed over from the automated driving mode to the manual driving mode.

When the travel mode is changed over from the manual driving mode to the automated driving mode after a state of the driver seat 6 has been stored, the relative position control unit 44 adjusts the state of the driver seat 6 to the state stored in the storage device 14.

When the travel mode is changed over to the automated driving mode, this operation enables the state of the driver seat 6 to be adjusted to a state of the driver seat 6 that was adjusted by the driver when the automated driving mode was selected the last time, which enables the state of the driver seat 6 to be adjusted in accordance with a preference of the driver. This capability enables effort of seat adjustment by the driver to be reduced.

Fourth Embodiment

Next, an operation device 7 for vehicle according to a fourth embodiment will be described. The operation device 7 for vehicle according to the fourth embodiment adjusts a state of a driver seat 6 in response to an operation on operation switches by a driver in each of an automated driving mode and a manual driving mode. The operation device 7 for vehicle accepts an operation of storing a state of the adjusted driver seat in a storage device 14 from the driver.

The operation of storing the state of the driver seat 6 may, for example, be an operation on a setting switch 11d that was described with reference to FIG. 2.

When the operation device 7 for vehicle accepts an operation on the setting switch 11d while a travel mode is the automated driving mode, the operation device 7 for vehicle stores a state of the driver seat 6 at the time of the operation in the storage device 14 as a state for the automated driving mode. After that, when the travel mode is changed over from the manual driving mode to the automated driving mode, the operation device 7 for vehicle adjusts the state of the driver seat 6 to the stored state for the automated driving mode.

When the operation device 7 for vehicle accepts an operation on the setting switch 11d while the travel mode is the manual driving mode, the operation device 7 for vehicle stores a state of the driver seat 6 at the time of the operation in the storage device 14 as a state for the manual driving mode. After that, when the travel mode is changed over from the automated driving mode to the manual driving mode, the operation device 7 for vehicle adjusts the state of the driver seat 6 to the stored state for the manual driving mode.

This configuration enables the state of the driver seat 6 to be adjusted in accordance with a preference of the driver when the travel mode is changed over. This capability enables effort of seat adjustment by the driver to be reduced.

Figure 13:
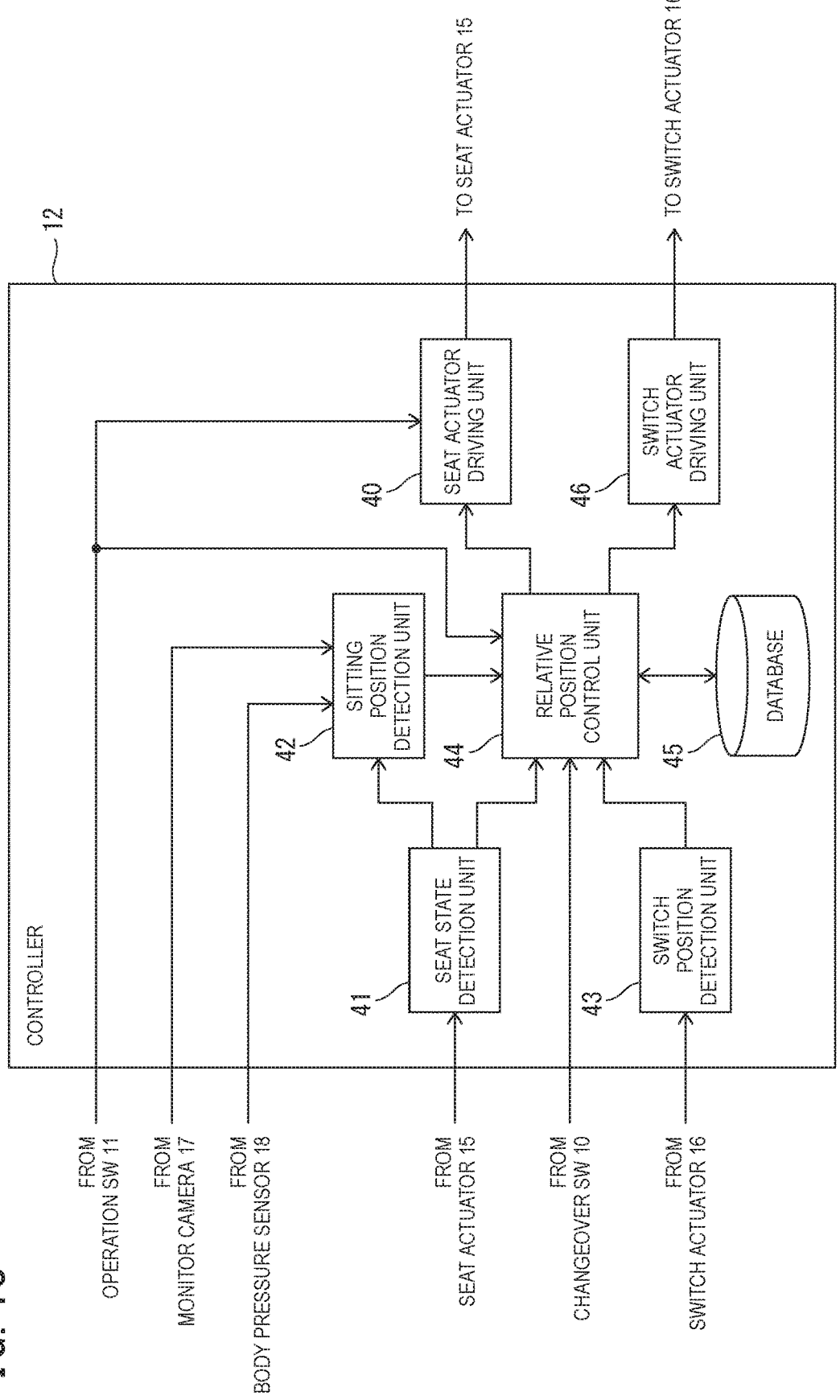
FIG. 13 is a block diagram illustrative of an example of a functional configuration of a controller according to a fourth embodiment.

FIG. 13 is now referred to. A relative position control unit 44 accepts an operation signal of the setting switch 11d. When the setting switch 11d is operated while the travel mode is the automated driving mode, the relative position control unit 44 stores information on a state of the driver seat 6 detected by a seat state detection unit 41 at the time of the operation in the storage device 14 as a state for the automated driving mode.

After that, when the travel mode is changed over from the manual driving mode to the automated driving mode, the relative position control unit 44 reads the information on the state for the automated driving mode stored in the storage device 14. The relative position control unit 44 controls a seat actuator driving unit 40 and thereby adjusts the state of the driver seat 6 to the read state for the automated driving mode.

On the other hand, when the setting switch 11d is operated while the travel mode is the manual driving mode, the relative position control unit 44 stores information on a state of the driver seat 6 detected by the seat state detection unit 41 at the time of the operation in the storage device 14 as a state for the manual driving mode.

After that, when the travel mode is changed over from the automated driving mode to the manual driving mode, the relative position control unit 44 reads the information on the state for the manual driving mode stored in the storage device 14. The relative position control unit 44 controls the seat actuator driving unit 40 and thereby adjusts the state of the driver seat 6 to the read state for the manual driving mode.

Next, an example of operation of the operation device 7 for vehicle according to the fourth embodiment will be described.

Figure 14A:
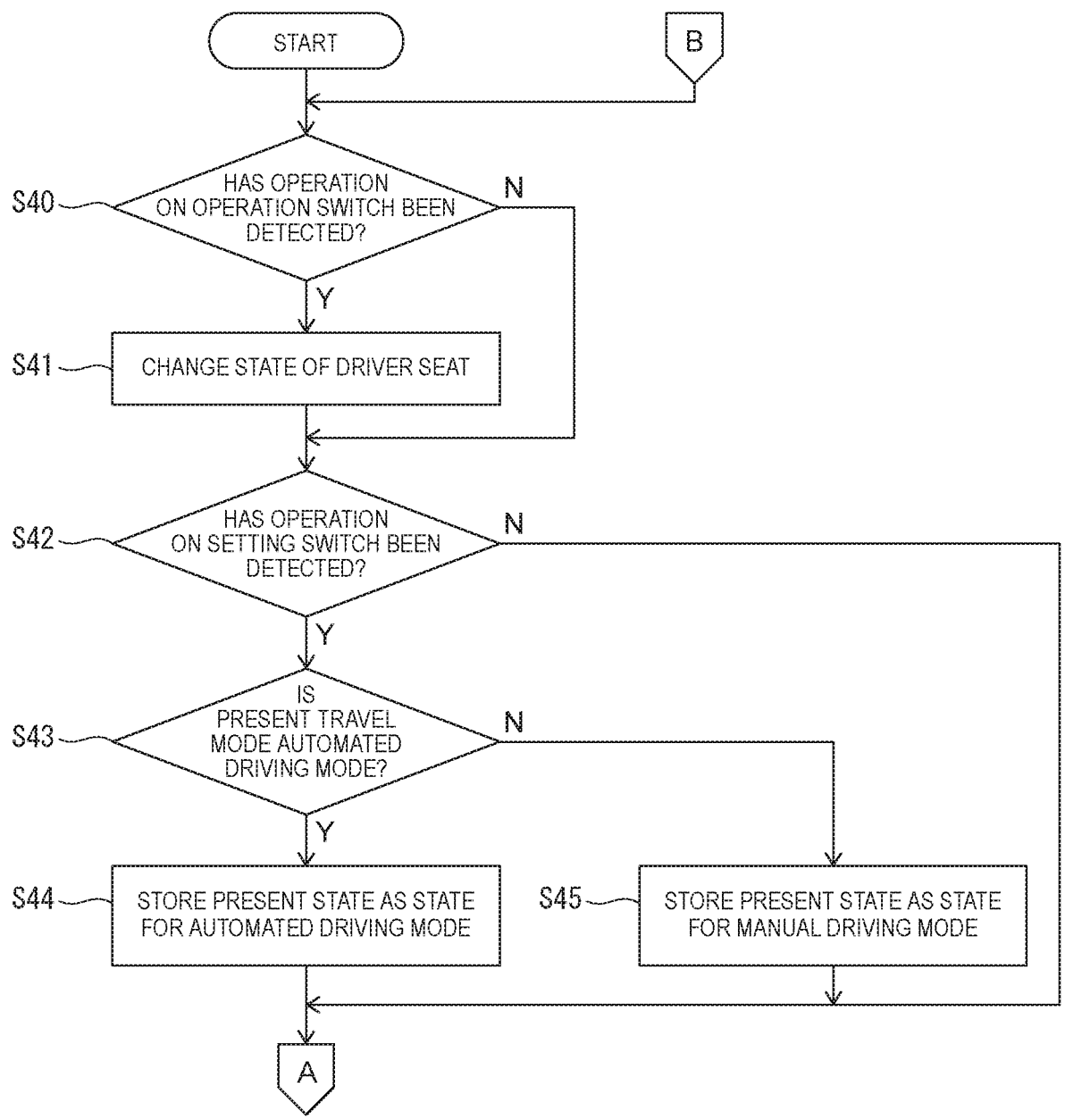
FIG. 14A is a flowchart (part 1) illustrative of an example of operation of an operation device for vehicle according to the fourth embodiment.
Figure 14B:
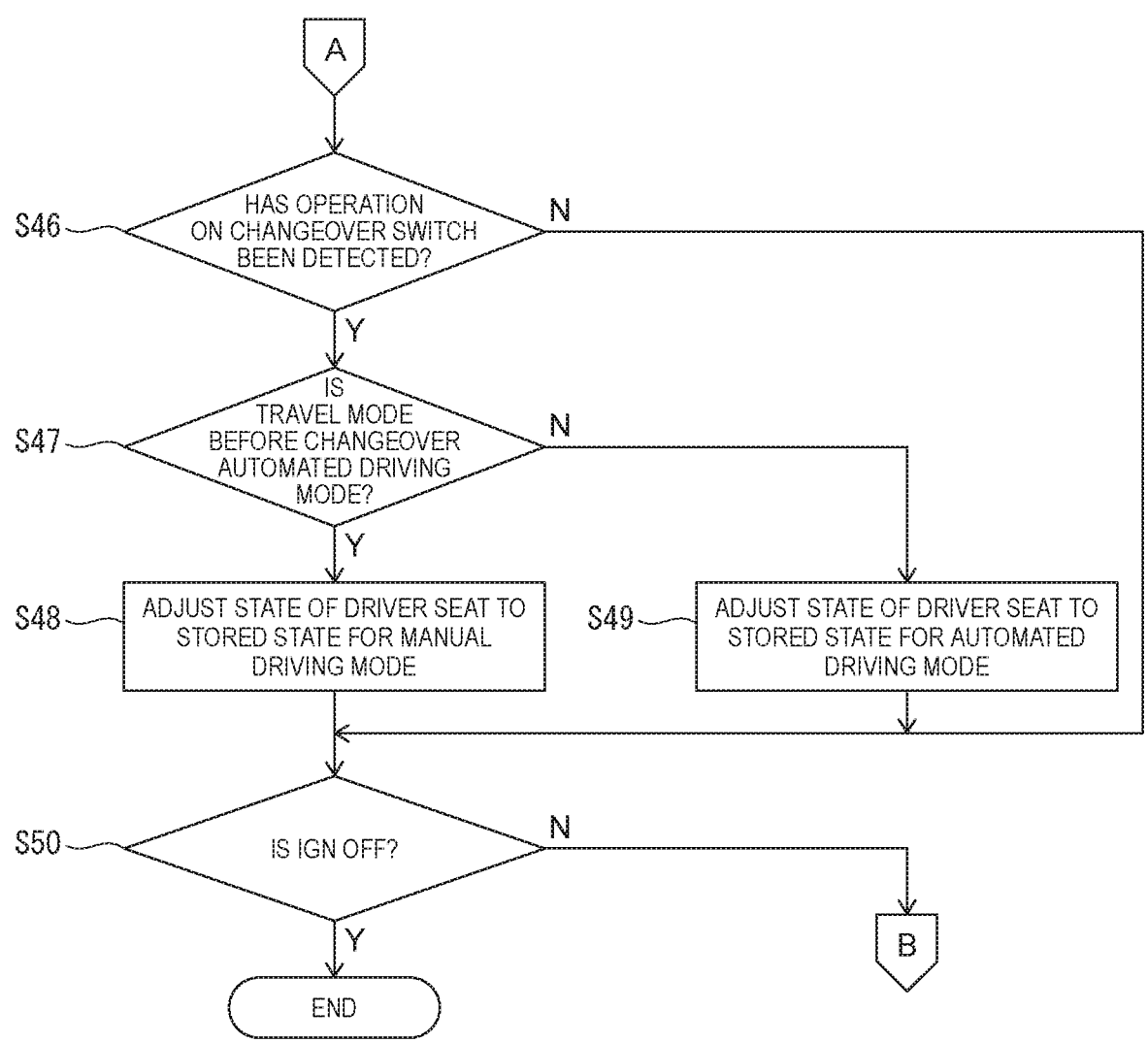
FIG. 14B is a flowchart (part 2) illustrative of the example of the operation of the operation device for vehicle according to the fourth embodiment.

FIGS. 14A and 14B are now referred to.

In step S40, the seat actuator driving unit 40 determines whether or not an operation on operation switches 11 by a driver to adjust a state of the driver seat 6 has been detected. When an operation on the operation switches 11 has been detected (Y in step S40), the process proceeds to step S41. When no operation on the operation switches 11 has been detected (N in step S40), step S41 is skipped and the process proceeds to step S42.

In step S41, the seat actuator driving unit 40 drives seat actuators 15 in accordance with the operation signal received from the operation switches 11 and thereby changes the state of the driver seat 6. Subsequently, the process proceeds to step S42.

In step S42, the relative position control unit 44 determines whether or not an operation on the setting switch 11d has been detected. When an operation on the setting switch 11d has been detected (Y in step S42), the process proceeds to step S43. When no operation on the setting switch 11d has been detected (N in step S42), the process proceeds to step S46.

In step S43, the relative position control unit 44 determines whether or not a present travel mode is an automated driving mode. When the present travel mode is the automated driving mode (Y in step S43), the process proceeds to step S44. When the present travel mode is not the automated driving mode, that is, when the present travel mode is a manual driving mode (N in step S43), the process proceeds to step S45.

In step S44, the relative position control unit 44 stores information on a present state of the driver seat 6 detected by the seat state detection unit 41 in the storage device 14 as a state for the automated driving mode. Subsequently, the process proceeds to step S46.

In step S45, the relative position control unit 44 stores information on a present state of the driver seat 6 detected by the seat state detection unit 41 in the storage device 14 as a state for the manual driving mode. Subsequently, the process proceeds to step S46.

In step S46, the relative position control unit 44 determines whether or not an operation on the changeover switch 10 by the driver to change over the travel mode has been detected. When an operation on the changeover switch 10 has been detected (Y in step S46), the process proceeds to step S47. When no operation on the changeover switch 10 has been detected (N in step S46), the process proceeds to step S50.

In step S47, the relative position control unit 44 determines whether or not the travel mode before the changeover is the automated driving mode. When the travel mode before the changeover is the automated driving mode (Y in step S47), the process proceeds to step S48. When the travel mode before the changeover is not the automated driving mode, that is, when the travel mode before the changeover is the manual driving mode (N in step S47), the process proceeds to step S49.

In step S48, the relative position control unit 44 controls the seat actuator driving unit 40 and thereby adjusts the state of the driver seat 6 to the state for the manual driving mode stored in the storage device 14. A vehicle control circuit 4 changes over the travel mode to the manual driving mode. Subsequently, the process proceeds to step S50.

In step S49, the vehicle control circuit 4 changes over the travel mode to the automated driving mode. The relative position control unit 44 controls the seat actuator driving unit 40 and thereby adjusts the state of the driver seat 6 to the state for the automated driving mode stored in the storage device 14. Subsequently, the process proceeds to step S50.

In step S50, whether or not an ignition switch of a vehicle 1 has been turned off. When the ignition switch of the vehicle 1 has been turned off (Y in step S50), the process is finished. When the ignition switch of the vehicle 1 has not been turned off (N in step S50), the process returns to step S40.

(Advantageous Effects of Fourth Embodiment)

(1) The seat actuator driving unit 40 adjusts a state of the driver seat 6 that includes at least any of a position of a seat cushion 6a or a seat back 6b in the longitudinal direction, inclination of the seat surface of the seat cushion 6a with respect to a horizontal plane of the vehicle 1, inclination of the seat back 6b with respect to the vertical direction of the vehicle 1, and a rotational position of the driver seat 6 about the up-down direction of the driver seat 6 as a rotational axis in response to an instruction from a driver when a travel mode is an automated driving mode.

The relative position control unit 44 stores the state of the driver seat 6 that has been adjusted in response to an instruction from the driver in the storage device 14 in response to an operation by the driver.

When the travel mode is changed over from a manual driving mode to the automated driving mode after the state of the driver seat 6 has been stored, the relative position control unit 44 adjusts the state of the driver seat 6 to the state stored in the storage device 14.

This operation enables the state of the driver seat 6 to be adjusted in accordance with a preference of the driver when the travel mode is changed over to the automated driving mode. This capability enables effort of seat adjustment by the driver to be reduced.

(2) The seat actuator driving unit 40 adjusts the state of the driver seat 6 that includes at least any of a position of the seat cushion 6a or the seat back 6b in the longitudinal direction, inclination of the seat surface of the seat cushion 6a with respect to a horizontal plane of the vehicle 1, inclination of the seat back 6b with respect to the vertical direction of the vehicle 1, and a rotational position of the driver seat 6 about the up-down direction of the driver seat 6 as a rotational axis in response to an instruction from the driver when the travel mode is the manual driving mode.

The relative position control unit 44 stores the state of the driver seat 6 that has been adjusted in response to an instruction from the driver in the storage device 14 in response to an operation by the driver.

When the travel mode is changed over from the automated driving mode to the manual driving mode after the state of the driver seat 6 has been stored, the relative position control unit 44 adjusts the state of the driver seat 6 to the state stored in the storage device 14.

This operation enables the state of the driver seat 6 to be adjusted in accordance with a preference of the driver when the travel mode is changed over to the manual driving mode. This capability enables effort of seat adjustment by the driver to be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
2 Situation detection sensor
3 Vehicle state sensor
4 Vehicle control circuit
5 Vehicle control actuator
6 Driver seat
6a Seat cushion
6b Seat back
6c Armrest
7 Operation device for vehicle
10 Changeover switch
11 Operation switch
12 Controller
13 Processor
14 Storage device
15 Seat actuator
16 Switch actuator
17 Monitor camera
18 Body pressure sensor
20 Steering wheel
21 Side console
22 Center console
23 Dashboard
40 Seat actuator driving unit
41 Seat state detection unit
42 Sitting position detection unit
43 Switch position detection unit
44 Relative position control unit
45 Database
46 Switch actuator driving unit

The invention claimed is:

1. A method for adjusting a switch position of a changeover switch of a vehicle, comprising:
 storing, when a travel mode of the vehicle is changed from an automated driving mode to a manual driving mode by operating the changeover switch, a relative position between the changeover switch and a driver seat, as a stored relative position for the automated driving mode,
 wherein the changeover switch is configured to change the travel mode of the vehicle between the automated driving mode and the manual driving mode, and wherein the changeover switch is movably disposed proximate, but separate from, the driver seat; and in response to detecting an operation of the changeover switch to the automated driving mode:
determining whether a distance between the changeover switch and the driver seat is within a predetermined distance;
in response to the distance between the changeover switch and the driver seat not being within the predetermined distance, adjusting the relative position between the changeover switch and the driver seat to be the stored relative position for the automated driving mode.

2. The method for adjusting the switch position according to claim 1, further comprising:
detecting a position of a seat cushion of the driver seat as a state of the driver seat and storing the position of the seat cushion as the stored relative position; and
adjusting the relative position between the changeover switch and the driver seat according to the state of the driver seat, wherein the changeover switch is adjusted more rearward as the position of the seat cushion is located more rearward.

3. The method for adjusting the switch position according to claim 1, further comprising:
detecting inclination of a seat cushion of the driver seat as a state of the driver seat and storing the inclination of the seat cushion as the stored relative position; and
adjusting the relative position between the changeover switch and the driver seat according to the state of the driver seat, wherein the changeover switch is adjusted more rearward as a seat surface of the seat cushion is inclined more downward from a front to a rear.

4. The method for adjusting the switch position according to claim 1, further comprising:
detecting a position of a seat back of the driver seat as a state of the driver seat and storing the position of the seat back as the stored relative position; and
adjusting the relative position between the changeover switch and the driver seat according to the state of the driver seat, wherein the changeover switch is adjusted more rearward as the position of the seat back is located more rearward.

5. The method for adjusting the switch position according to claim 1, further comprising:
detecting inclination of a seat back of the driver seat as a state of the driver seat and storing the inclination of the seat back as the stored relative position; and
adjusting the relative position between the changeover switch and the driver seat according to the state of the driver seat, wherein the changeover switch is adjusted more rearward as the seat back is inclined more rearward with respect to a vertical direction of the vehicle.

6. The method for adjusting the switch position according to claim 1, further comprising:
detecting a sitting position of the driver sitting on the driver seat and storing the sitting position of the driver as the stored relative position; and
adjusting the relative position between the changeover switch and the driver seat according to the sitting position, wherein the changeover switch is adjusted more rearward as the sitting position is located more rearward.

7. The method for adjusting the switch position according to claim 5, wherein the inclination of the seat back when the travel mode is the automated driving mode is set to be larger than an inclination of the seat back when the travel mode is the manual driving mode.

8. The method for adjusting the switch position according to claim 2, wherein the position of the seat cushion when the travel mode is the automated driving mode is adjusted more rearward than a position of the seat cushion when the travel mode is the manual driving mode.

9. The method for adjusting the switch position according to claim 1, further comprising:
adjusting a state of the driver seat including at least any of a position of a seat cushion or a seat back in a longitudinal direction, inclination of a seat surface of the seat cushion with respect to a horizontal plane of the vehicle, inclination of the seat back with respect to a vertical direction of the vehicle, and a rotational position of the driver seat about an up-down direction of the driver seat as a rotational axis in response to an instruction from the driver when the travel mode of the vehicle is the automated driving mode;
storing the state of the driver seat having been adjusted in response to an instruction from the driver in a storage device as the stored relative position in response to an operation by the driver; and
when the travel mode of the vehicle is changed over from the manual driving mode to the automated driving mode after the state of the driver seat has been stored, adjusting the relative position between the changeover switch and the driver seat to the stored relative position in the storage device.

10. The method for adjusting the switch position according to claim 1, further comprising:
adjusting a state of the driver seat including at least any of a position of a seat cushion or a seat back in a longitudinal direction, inclination of a seat surface of the seat cushion with respect to a horizontal plane of the vehicle, inclination of the seat back with respect to a vertical direction of the vehicle, and a rotational position of the driver seat about an up-down direction of the driver seat as a rotational axis in response to an instruction from the driver when the travel mode of the vehicle is the manual driving mode;
storing the state of the driver seat having been adjusted in response to an instruction from the driver in a storage device in response to an operation by the driver; and
when the travel mode of the vehicle is changed over from the automated driving mode to the manual driving mode after the state of the driver seat has been stored, adjusting the state of the driver seat to the state stored in the storage device.

11. The method for adjusting the switch position according to claim 1, further comprising:
storing a state of the driver seat including at least any of a position of a seat cushion or a seat back in a longitudinal direction, inclination of a seat surface of the seat cushion with respect to a horizontal plane of the vehicle, inclination of the seat back with respect to a vertical direction of the vehicle, and a rotational position of the driver seat about an up-down direction of the driver seat as a rotational axis in a storage device before the travel mode of the vehicle is changed over from the manual driving mode to the automated driving mode; and
when the travel mode of the vehicle is changed over from the automated driving mode to the manual driving mode after the state of the driver seat has been stored, adjusting the state of the driver seat to the state stored in the storage device.

12. The method for adjusting the switch position according to claim 1, further comprising:

storing a state of the driver seat including at least any of a position of a seat cushion or a seat back in a longitudinal direction, inclination of a seat surface of the seat cushion with respect to a horizontal plane of the vehicle, inclination of the seat back with respect to a vertical direction of the vehicle, and a rotational position of the driver seat about an up-down direction of the driver seat as a rotational axis in a storage device as the stored relative position before the travel mode of the vehicle is changed over from the automated driving mode to the manual driving mode; and when the travel mode of the vehicle is changed over from the manual driving mode to the automated driving mode after the state of the driver seat has been stored, adjusting the relative position between the changeover switch and the driver seat to the stored relative position in the storage device.

13. The method for adjusting the switch position according to claim 1, wherein the changeover switch is disposed on a center console of the vehicle.

14. The method for adjusting the switch position according to claim 1, wherein the changeover switch is disposed on a side console of the vehicle.

15. An operation device for vehicle comprising:

a changeover switch configured to change over a travel mode of a vehicle between an automated driving mode in which travel of the vehicle is controlled in an automated manner and a manual driving mode in which travel of the vehicle is operated by a driver, wherein the changeover switch is movably disposed proximate a driver seat; and a controller configured to:

store, when an operation on the changeover switch is detected in the automated driving mode, a relative position between the changeover switch and the driver seat, as a stored relative position for the automated driving mode; and in response to detecting an operation of the changeover switch to the automated driving mode:

determine whether a distance between the changeover switch and the driver seat is within a predetermined distance;

in response to the distance between the changeover switch and a driver seat not being within the predetermined distance, adjust the relative position between the changeover switch and the driver seat to be the stored relative position for the automated driving mode.

16. The method of claim 1, further comprising:

detecting a state of the driver seat, the state including at least one of a position of the driver seat or an inclination of the driver seat; and adjusting a position of the changeover switch according to the state of the driver seat by a first actuator by accepting an instruction for the driver seat from the driver when the travel mode is the automated driving mode and then adjusting the position of the changeover switch according to the instruction, wherein the first actuator is separate from a second actuator that is for changing the state of the driver seat.

17. The operation device of claim 15, further comprising:

an actuator configured to adjust a state of the driver seat including at least either a position of the driver seat or an inclination of the driver seat; and a movement mechanism separate from the actuator, the movement mechanism being configured to adjust a position of the changeover switch according to a state of the driver seat, wherein the controller further configured to:

accept an instruction for the driver seat from the driver when the travel mode is the automated driving mode and adjust the position of the changeover switch according to the instruction.

* * * * *